Figure 1:
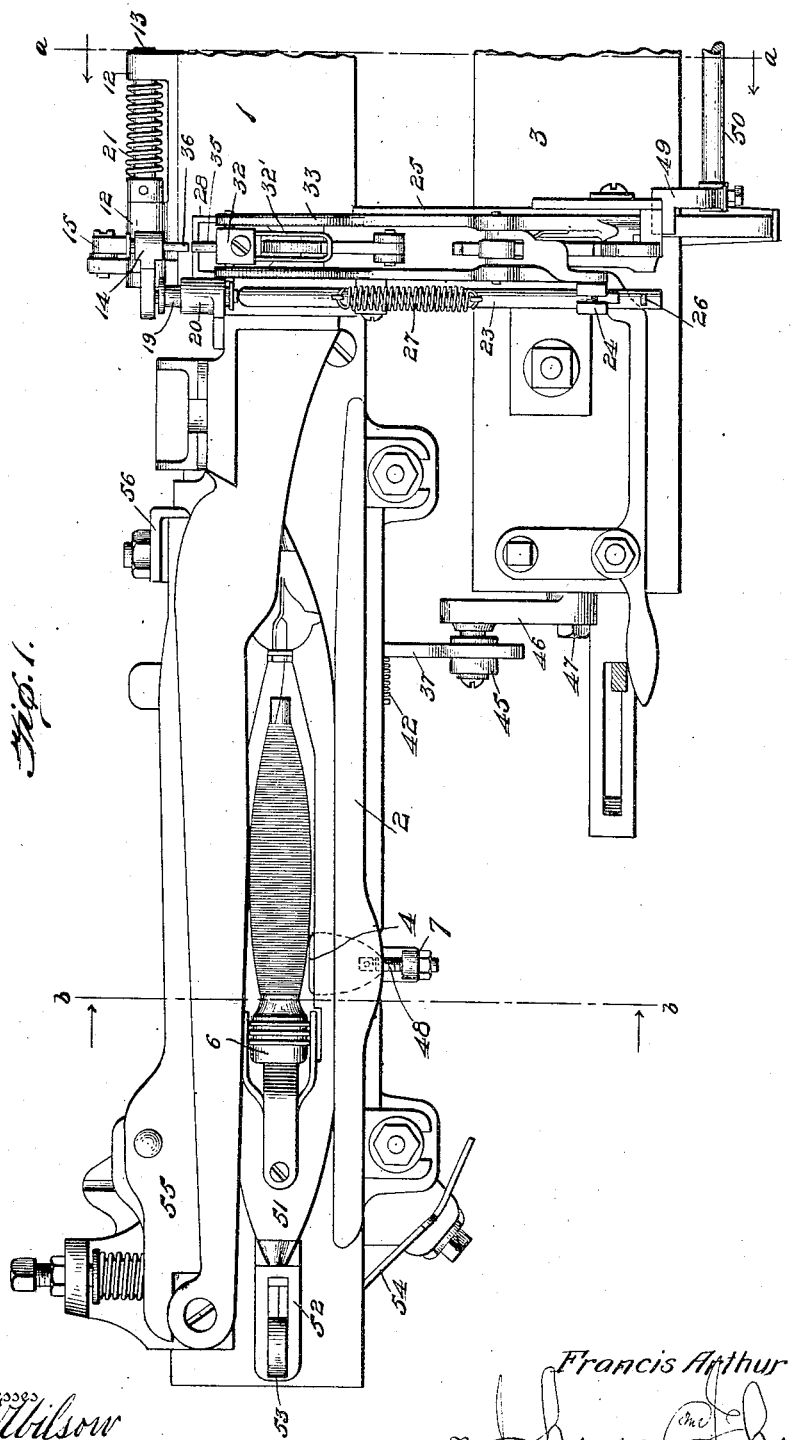

F. A. MILLS.
LOOM.
APPLICATION FILED SEPT. 21, 1905.

935,802.

Patented Oct. 5, 1909.
5 SHEETS—SHEET 1.

Witnesses
D. E. Wilson
Anne B. Johnson

Inventor
Francis Arthur Mills
By Johnson & Johnson
Attorneys

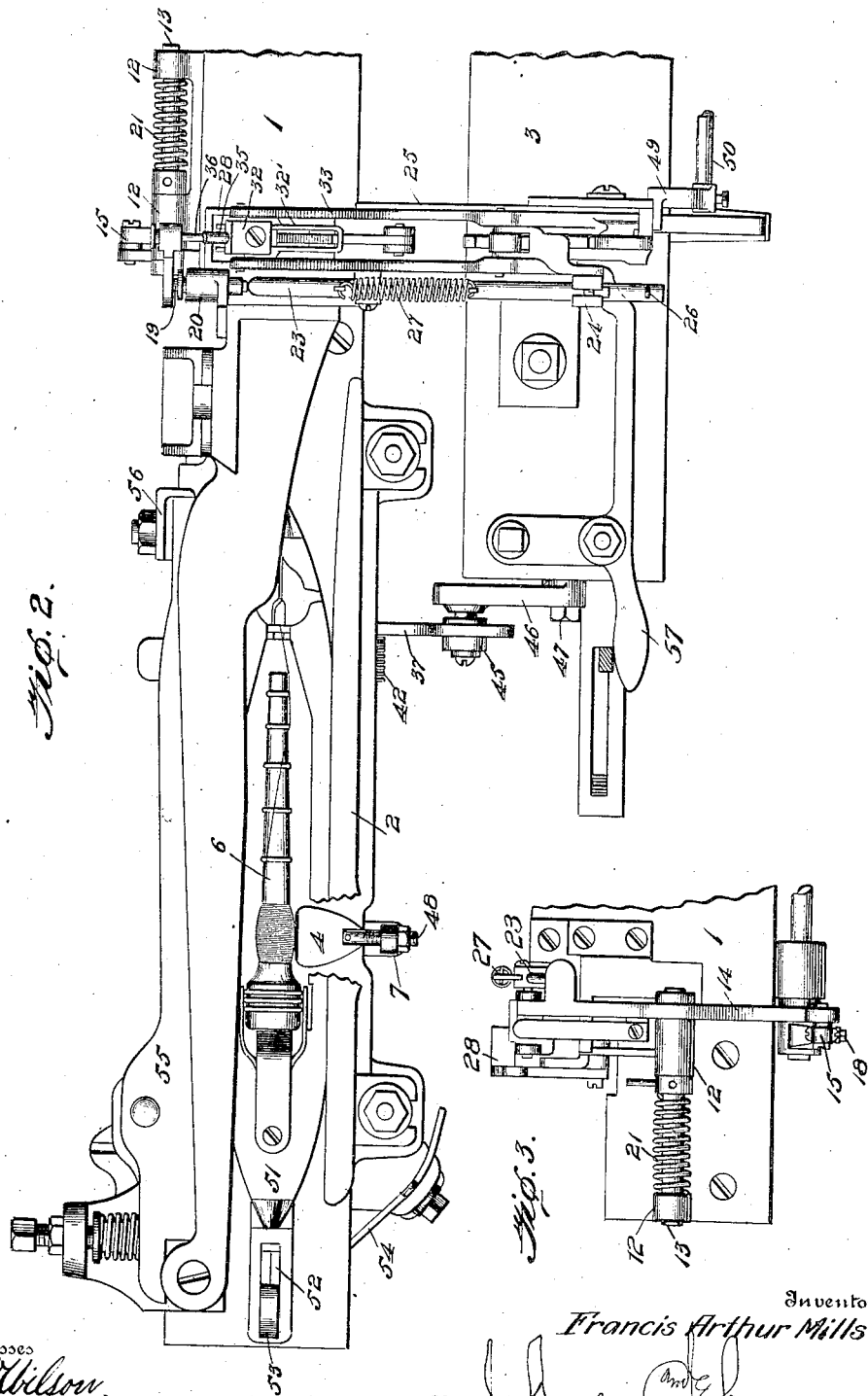

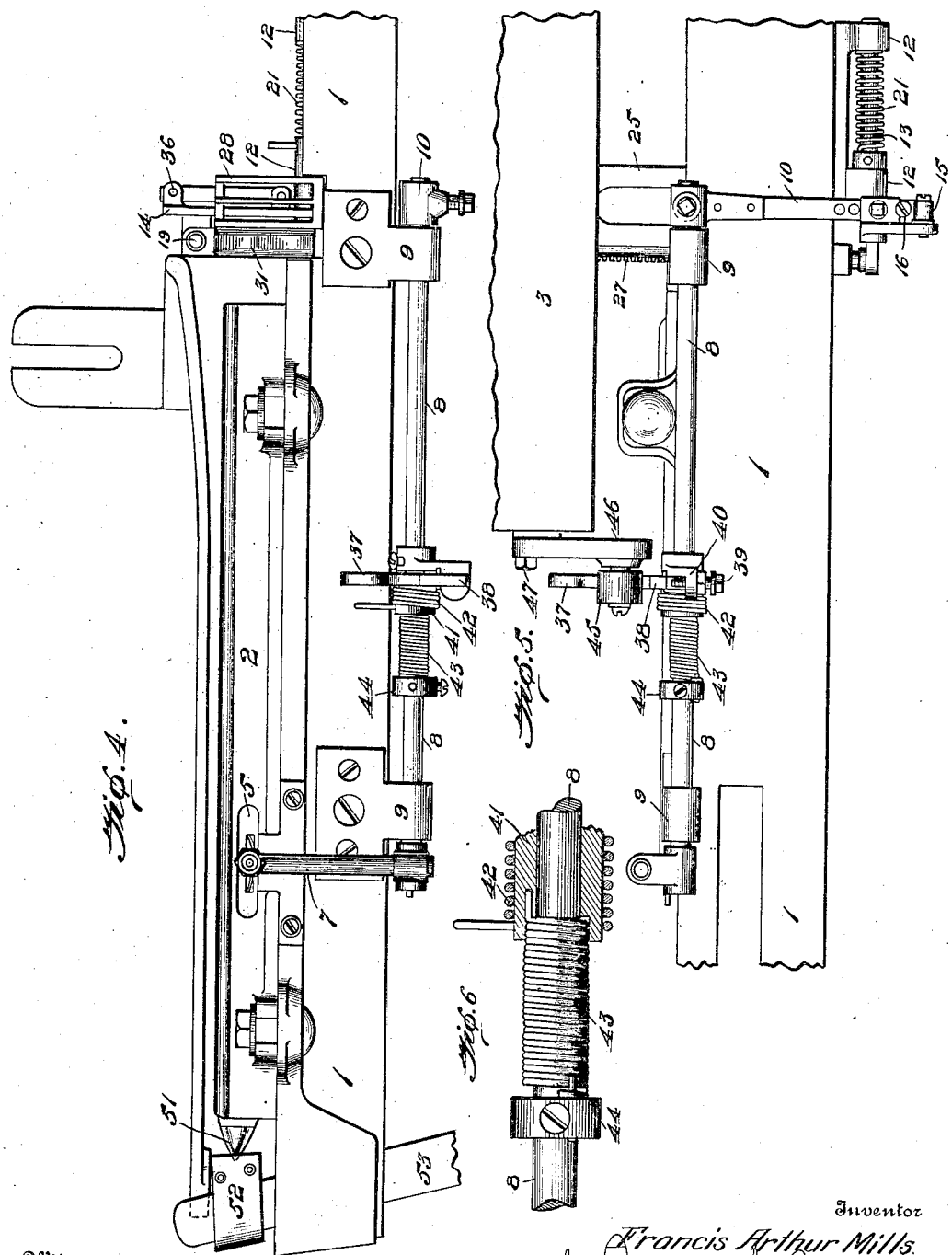

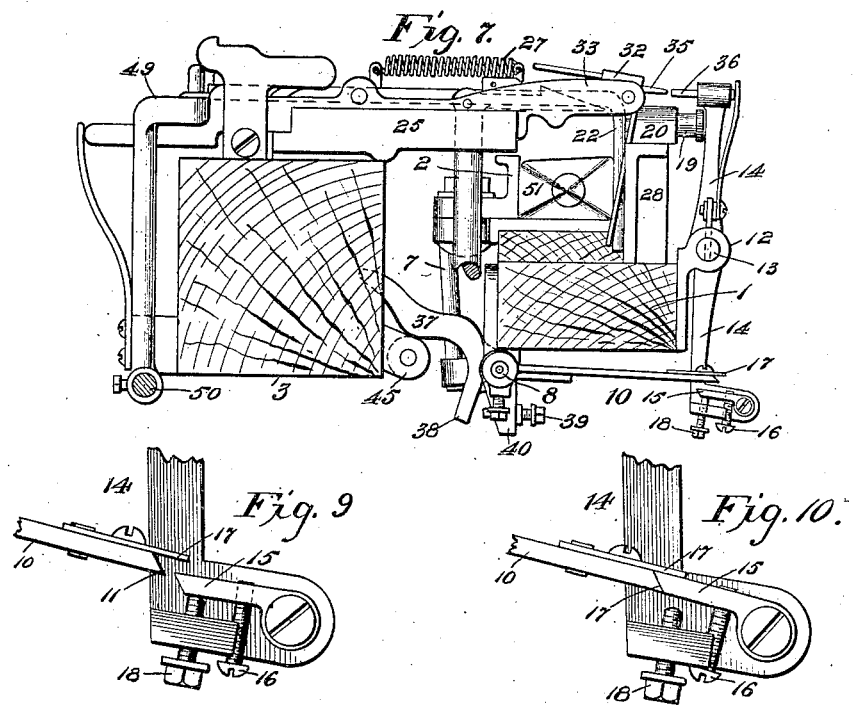
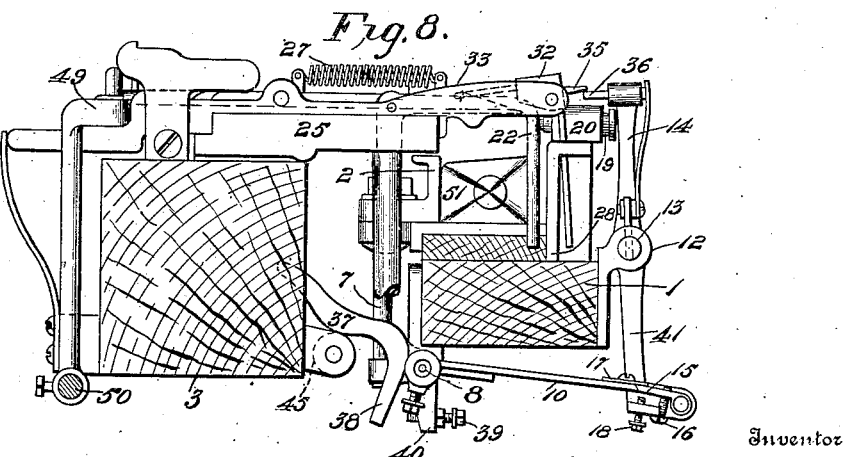

F. A. MILLS.
LOOM.
APPLICATION FILED SEPT. 21, 1905.
935,802.
Patented Oct. 5, 1909.
5 SHEETS—SHEET 5.
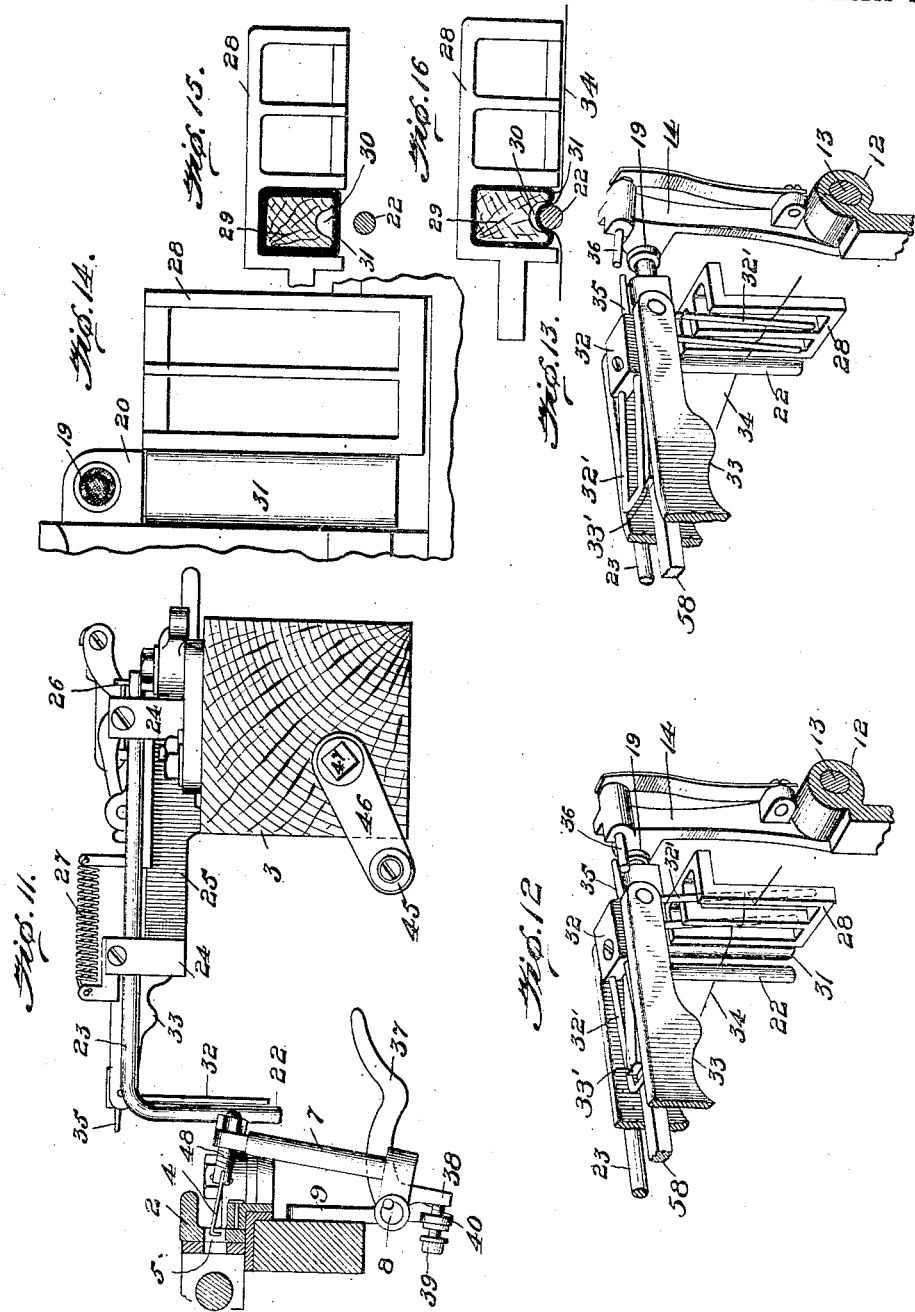
Witnesses
L. C. Wilson
Anne B. Johnson
Inventor
Francis Arthur Mills
By Johnson & Johnson
Attorneys

UNITED STATES PATENT OFFICE.

FRANCIS ARTHUR MILLS, OF LAWRENCE, MASSACHUSETTS.

LOOM.

935,802.

Specification of Letters Patent. Patented Oct. 5, 1909.

Application filed September 21, 1905. Serial No. 279,419.

*To all whom it may concern:*

Be it known that I, FRANCIS ARTHUR MILLS, a citizen of the United States, residing at Lawrence, in the county of Essex and State of Massachusetts, have invented certain new and useful Improvements in Looms; and I do hereby declare the following to be a full, clear, and exact description of the invention, such as will enable others skilled in the art to which it appertains to make and use the same.

My invention is directed to improvements in looms wherein automatic filling supplying mechanism is controlled to operate by or through a feeler which feels the filling in the shuttle and before the complete exhaustion of the filling causes the operation of the filling supplying mechanism; and my invention consists of certain novel parts and combinations of parts whereby the weft-fork is prevented from tilting and a weft-thread holding-device prevented from holding the weft-thread which will be separately pointed out in the claims concluding this specification.

The following description read in connection with the accompanying drawings will enable any person skilled in the art to which my invention relates to understand and to practice my invention in the form in which I prefer to employ it; but it will be understood that my invention is not limited to the precise form and details of construction herein illustrated and described, as the same may be changed or modified in various particulars without departing from the spirit of my invention and the scope of the claims.

Referring to these drawings,—Figure 1 shows in top view the left hand end part of the lay and a sufficient portion of the breast-beam to illustrate one embodiment of my invention which resides in novel mechanism wherein automatic filling-supplying mechanism is controlled in its operation by or through a feeler which feels the filling on its carrier to determine the amount of filling to a predetermined point, the feeler mechanism being in the position it occupies when in contact with the filling. Fig. 2 is an identical view, the feeler mechanism being in the position it occupies when the filling has been exhausted from its carrier to the predetermined amount at which the bobbin or filling-carrier will be automatically ejected. Fig. 3 shows a rear view of certain of the feeler mechanism parts which are operated by the weft-thread holding mechanism. Fig. 4 is a front elevation of that portion of the lay shown in Fig. 1, showing the feeler mechanism parts as they are mounted on the lay. Fig. 5 is a bottom view of the same. Fig. 6 shows enlarged the feeler spring connections with its operating shaft. Fig. 7 is a transverse section taken on the line $a\,a$ of Fig. 1 showing the feeler mechanism in the position it occupies in said figure. Fig. 8 is an identical view showing the feeler mechanism in the position it occupies in Fig. 2. Fig. 9 shows enlarged in detail that part of the feeler mechanism by which the connection of the parts is adjusted to determine the amount of filling on its carrier when it is to be ejected. Fig. 10 shows the same parts in the positions they occupy when such connection has been made. Fig. 11 shows an end view of the breast-beam and the weft fork and weft-thread holding mechanism and a transverse section of the lay on the line $b\,b$ of Fig. 1 showing the feeler mechanism in the position it occupies when the lay has moved back. Fig. 12 shows in perspective the weft-fork connection with the feeler-device and the weft-thread holding device in the positions they occupy as in Fig. 8, the weft-thread being pushed through the grid by the weft fork. Fig. 13 is an identical view the parts being in the positions seen in Fig. 7, the weft-thread being held taut across the grid. Fig. 14 shows in front view the weft-grid and the yielding buffer of the weft-thread holding device. Fig. 15 is a top of the same showing the relation of the weft-thread holding arm with the yielding buffer when out of impact contact. Fig. 16 is an identical view showing the weft-holding arm in impact contact with the yielding buffer.

My invention is specially adapted for use in what is known as automatic filling replenishing looms in which a filling feeder is employed to transfer a fresh supply of filling from a magazine to a shuttle, as for instance in the United States Patent No. 529,942, but which it is unnecessary to show or describe, as my invention may be applied to any loom in which the filling is automatically replenished.

The lay 1, shuttle-box 2 thereon, and the breast-beam 3 are and may be of the usual construction in looms. I have shown the feeler-finger 4, as passing through a slot 5, in the front wall of the shuttle-box and shuttle to make connection with the filling on the filling carrier 6, and for this purpose the feeler-finger 4, is mounted on the upper end of an arm 7, which is preferably mounted at the front of the lay on a shaft 8, which is mounted in bearings 9—9 on the underside of the lay, so that a rocking movement of the shaft will cause the feeler-finger to be moved in contact with and from the filling on the filling carrier. This rock-shaft 8, has another arm 10, extending transversely under and terminating in a knife edge 11, at the rear of the lay, see Figs. 9 and 10.

Mounted in brackets 12—12 at the rear side of the lay is a shaft 13, on which an arm 14, is fixed, its lower end having a knife-edge trip-pawl 15, and pivotally mounted with its knife-edge, standing toward the knife 11 of the arm 10, and so arranged and related to each other that the pawl 15, will be caused to engage and trip the said arm 10, as seen in Figs. 8, 9 and 10. For effecting this engagement and tripping of the feeler-rock-shaft arm 10, the vertical arm 14, is caused to be vibrated and being mediately mounted on the shaft 13, the upper part of said arm, will be pushed back thereby causing the lower end carrying the trip pawl 15 to be moved forward toward the knife edged arm 10, and effect the engagement of the tripping parts when the filling has been run off the bobbin to the predetermined point as shown in Figs. 2, 8 and 10. In this operation it will be understood that when the loom is running and the bobbin carrier having more filling than the predetermined amount, the feeler-finger will be held so as to hold the knife-edge arm 10, above the knife-edge trip-pawl and allow it to pass beneath the knife-edge of the arm 10 by the vibration of the arm 14, as seen in Fig. 7, and this operation, will continue as long as there is more than the predetermined amount of filling. The purpose of this pawl engagement as seen in Figs. 8, and 10, is to form a stop to hold the arm carrying the pawl from movement as will be presently explained. Referring particularly to Figs. 9 and 10, it will be seen that this engagement is effected by the screw 16, which limits the upward movement of the pawl and an overhanging part 17, on the arm 10, will engage and rest upon the end of the pawl and thus hold the engaged parts in abutting relation as in Fig. 10. To determine the amount of filling to be left on the filling carrier, an adjusting screw 18, in the end of the pawl-carrying arm beneath the pawl, is adjusted. The vertical adjustment of said screw will cause more filling to be left on the carrier, because thereby the pawl will be caused to trip the knife edged arm 10, sooner, while by lowering the screw the pawl will be caused to fall lower thereby causing the pawl to trip the arm 10 later, which will cause more filling to be woven from the filling-carrier. The upper end of the pawl carrying arm is in engagement with a pusher 19, seated in a fixed guide 20, to receive the impact of a spring pressed weft-thread holding-device; and a spring 21, coiled on the shaft 13, acts by torsion to hold the pawl end of the arm back and its upper end forward so that each forward movement of the lay will cause impact of the pusher 19 on the arm 14, of the weft-thread holding device. The depending arm 22, of the weft-thread holding device is carried by horizontal rod 23 mounted to slide in guides 24 on a bracket 25 on the breast-beam and is normally held in position to receive the impact of the pusher. A stop 26, is provided on the rod 23, to hold it in its normal position against the tension of a spring 27.

A grid 28 preferably of two spaces is mounted at the mouth of the shuttle-box and in a recess between said grid and the mouth of the shuttle-box, is seated or confined a buffer preferably formed of a piece of wood 29, Figs. 15 and 16, having a vertical face groove 30, and a thin rubber tube 31, stretched over the grooved piece of wood making thereby a yielding buffer to impact upon the weft-thread holding arm 22 for yielding and frictionally holding the weft-thread.

The thin rubber crossing the groove in the wood will conform to the weft-thread holding-arm, when the buffer strikes said arm and the latter being spring pressed the thin rubber impact wall will be compressed within the groove and thereby cause a gripping action of the weft thread holding-arm on the weft-thread or filling holding it under frictional tension. The weft-fork 32, preferably of two tines has the usual loop 32' pivotally mounted on a slide 33, and adapted to tilt by the action of the grid pushing the weft-thread 34, which leads from the cloth to the shuttle against the weft-fork tines. The weft-fork slide is held in its normal position toward the grid by spring pressure. The tine holder of the weft-fork has a pin or projection 35 and the upper end of the pawl carrying arm has a spring pressed pin 36 slidable in a guide or bore and standing toward the pin in the tine-holder and this spring pressed pin has a coöperating action with the pin in the tine-holder when the lay has moved forward to prevent the tilting of the weft-fork, and thereby cause the weft-fork hammer to engage the weft-fork loop. In the forward movement of the lay should the pin in the tine-holder strike the end of the spring pressed pin carried by the pawl carrying-arm, the spring pressed pin will yield and thus prevent any breakage or disorder of the parts.

It will be understood that it is the forward movement of the lay that causes the operation of the feeler and weft-thread holding-devices, and the means operated by the forward movement of the lay for operating said devices I will now describe.

On the feeler-shaft is loosely mounted an arm 37 projecting forward, having a cam formation on its underside, and terminating in a depending abutment 38, which strikes the end of an adjusting screw 39, in a lever 40, fastened on said shaft. The cam lever has a hub 41, which forms a long bearing therefor and on which is coiled a torsion spring 42, having one end connected to the depending abutment 38, and its other end connecting the lay, so that the torsional action of said spring will cause the abutment 38 of the cam-arm 37 to abut against an adjusting screw 39, on the lay in the lever 40, fixed on the feeler shaft 8, and rock said shaft in a direction to hold the feeler-finger away from the filling on the filling carrier. A feeler spring 43, is placed on the feeler-shaft having one end fastened to the hub of the cam-lever and its other end fastened to a collar 44, fixed on said shaft, for the purpose of pressing the feeler-finger inward on the filling, and it is important to note that the upward movement of the cam-lever is against the torsion of both springs and that said springs being independent of each other allows independent adjustment of the feeler-spring to regulate the pressure of the feeler-finger on the filling.

It is important to note that the feeler-finger, the feeler-shaft and the arm 10, are rigidly connected and having no joints, this gives the advantage of maintaining its fixed adjustment on the lay and not be affected by lost motion or wear of the parts between the breast-beam and the lay, or by the vibration incident to the operation of the loom.

The arrangement of the feeler-mechanism with respect to the lay gives the advantage of making connection of the weft-fork with the weft-thread holding-device on the breast-beam and thereby operating in connection with said weft-fork and said weft-thread holding-device and so far as I know and can find I am the first to organize in a loom mechanism whereby a feeler-device is caused to hold and prevent the weft-fork from being tilted by the weft-thread for causing a change of filling, when the filling on the bobbin reaches a predetermined point at which point the bobbin is ejected. I am also the first to devise means whereby a feeler-device is caused to prevent the weft-thread holding-device from holding the weft-thread which will permit the weft-fork to push the weft-thread through the grid and thereby cause a fresh supply of filling in the shuttle when the filling on the bobbin has reached the predetermined point at which point the bobbin will be ejected. I am also the first to employ in a loom means whereby the weft-fork is held and prevented from tilting by the weft-grid pressing the weft-thread against the weft-fork in coöperation with means whereby the weft-thread holding device is held away and prevented from holding the weft-thread so that the fork can push the weft-thread through the grid.

To operate the feeler-finger and the mechanism whereby the foregoing operations are effected, the feeler-shaft is operated at every forward beat of the lay by the contact of the cam-arm on the feeler-shaft with a roll 45, fixed on a bracket on the breast-beam so as to cause the cam-arm to be lifted thereby rocking the feeler-shaft and it is this lifting of the cam-arm that causes the inward movement of the feeler-finger and the downward movement of the knife-edged arm 10, and it will be understood that the extent of these movements will be governed by the amount of filling on the filling carrier, and that the independent action of the cam-arm allows it to have freedom of movement governed by the amount of filling on the bobbin. It will therefore be seen that the filling on the bobbin carrier determines the extent of movement of the feeler-finger and the knife-edged arm, independent of movement given to the cam-arm. The roll is preferably carried by an arm 46, mounted on the breast beam and made adjustable by a clamp-bolt 47, so as to give more or less and earlier or later movement to the cam-arm and thereby cause an earlier or later movement to the feeler-device to cause it to contact sooner or later with the filling on its carrier.

In mounting the elements of the feeler-mechanism on the lay, there is provision for six adjustments, viz: The feeler-finger by its screw-mounting stem 48, may be adjusted on its arm toward and from the filling on the filling-carrier and secured by a nut; the adjustment of the feeler actuating cam-arm with respect to the actuating roll by the screw 39; the adjustment of the actuating roll-arm with respect to the cam-arm on the feeler-shaft by the screw 47; the adjustment of the tension of the torsion spring on the shaft of the pawl carrying arm to give proper cushioning action to the impact of the pusher upon the arm of the weft-thread holding device causing thereby the operation of the pawl carrying arm; the adjustment of the tension of the feeler-spring on the feeler-shaft for causing more or less pressure of the feeler-finger on the filling by properly adjusting the collar 44, which connects said spring with its shaft; and the adjustment of the pawl by the screw 18 for causing the predetermined amount of filling to be left on the bobbin, it being the most essential adjustment.

Referring to Fig. 1 the bobbin carrier has its maximum of filling on the filling carrier in the shuttle and at every other forward beat of the lay the shuttle will be picked or thrown into the shuttle-box as shown, and this movement of the lay will cause the cam-arm of the feeler mechanism to contact with the roll on the breast-beam thereby lifting the cam-arm causing the feeler shaft to be rocked and the feeler-finger caused to engage the filling on the filling carrier. Simultaneously the knife-edged arm 10, will be moved down toward the trip-pawl according to the amount of filling on the filling carrier at the point of contact of the feeler-finger with the finger. The lay then moving rearward will cause the cam-arm to become disengaged with the roll and forced down by its spring, causing the feeler-shaft to rock and thereby the feeler-finger to be moved away from its contact with the filling and the knife-edged arm will be moved upward farther from the trip-pawl, and so long as there is more than a predetermined amount of filling on the filling carrier the knife-edged-arm will not be moved into engagement with the trip-pawl, the loom will continue weaving and the weft-thread holding device will be operating the arm which carries the trip-pawl by its engagement with the pusher's connection with said arm. When the filling has been run off its carrier to the predetermined point the feeler-finger will have moved farther toward the filling carrier thereby causing the feeler-shaft to be rocked by its cam-arm and the knife edge of the arm moved thereby in the path of the knife edge of the trip-pawl and lift it effecting thereby their engagement. By this engagement the pawl carrying arm is held from movement which will hold the weft-thread holding device from holding the weft-thread under tension, and cause the spring pressed pin of the pawl carrying arm to pass beneath the pin of the tine holder, so that the weft-fork cannot be tilted by the weft-thread and which will thereby cause the weft-fork to push the weft-thread through the weft grid between its bars as seen in Fig. 12. This operation will cause the pin of the tine holder to ride and rest upon the pin of the pawl carrying arm and thereby cause the loop of the weft-fork to be held in the path of and be caught by the shoulder or hook 33 of the weft-fork hammer or actuator 58 and this connection will cause the hammer to pull back the weft-fork slide. This movement of said slide will cause the upper end of the arm 49, to be moved back thereby rocking the horizontal shaft 50, which causes the operation of the filling replenishing mechanism and which is well understood in the art. By preventing the weft-thread holding arm from holding the weft-thread the weft-fork will push the weft-thread through the grid and cause the operation of the transfer of a fresh supply of filling from a magazine into the shuttle when the shuttle is picked to the opposite shuttle-box; or by holding and preventing the weft-fork from tilting will effect the same result, and while either of the above methods will cause the operation stated I prefer to use both methods conjointly. 51 is the shuttle, 52 is the picker, 53 is the picker-stick, 54 is the impact-strap for the picker-stick, 55 is a shuttle-binder, and 56 is a stop for limiting the outward movement of said shuttle-binder, and 57 is the knock off lever mounted on the breast-beam.

From the foregoing it will be seen that it is the operation of the trip-pawl, its co-acting knife-edged arm, and the feeler device, in conjunction with means for engaging and preventing the operation of the weft-fork, that determines and effects the ejectment of the nearly exhausted filling carrier. In this operation supposing the filling-carrier to be full of filling or have more on it than the predetermined amount, the normal position of the knife-edged arm will be above the plane of the trip-pawl and in that position the trip-pawl will be caused by the vibrations of its carrying-arm to move under the knife-edge of the arm 10, and from its raised position said arm, as the filling decreases, will be caused to descend until it reaches the plane of the trip-pawl, when the trip-pawl will automatically engage and be locked with the end of said knife-edged arm. For this purpose the knife edges are so beveled and related that the gradual reduction of the filling will cause a gradual lowering of the knife-edged arm so that when the filling is exhausted to the predetermined point, the knife-edge of said arm will have reached the position in which it is in horizontal alinement with the knife edge of the trip-pawl and coming together by the vibration of the pawl carrying arm, will be engaged and maintained in such engagement while the nearly exhausted filling carrier is being ejected. In this engagement the pawl will have a vertical movement with the engaged end of the arm, the head of the depending screw 16, by its engagement with a lug on the pawl carrying arm serving to limit the upward movement of said pawl and the adjusting screw 18 passing through said lug serving to limit the descent of said pawl, which is its normal position while both adjustments co-act to stop the vibrations of the vertical arm and thereby cause its spring pressed pin to be engaged with and prevent the tilting of the weft-fork and also prevent the weft-thread holding arm 22 from holding the weft-thread at the time when the exhausted bobbin is to be ejected and in this way the function of this engaging and tripping device, is controlled by the function of the feeler-device and the movement of the lay. In this operation the weft-thread holding-device has two functions, viz: that of holding the weft-thread or filling against the buffer as in Fig. 16 by causing the arm 22 to receive the impact of the buffer pressing the filling against its thin buffer web and the latter into the groove of the buffer-core and deflecting the filling into a corresponding groove made by the deflection of the thin buffer web, and thus take up and hold the filling with a yielding contact. The impact of the weft-thread holding-device also serves as the means of vibrating the vertical arm 14, which carries the trip-pawl on its lower end and at its upper end it carried the pusher pin 19, which receives the impact of the filling holding device to vibrate said arm in effecting its engagement and tripping of the pawl device.

I claim:

1. In a loom, the lay, the shuttle-box, the shuttle, the filling-carrier, a weft-grid and a weft-fork, and means for preventing the weft-fork from tilting for causing the ejection of a filling carrier when the filling has been reduced to a predetermined point.

2. In a loom, the lay, the shuttle-box, the shuttle, the filling-carrier, a weft-grid and a weft-fork, a weft-thread holding device and means for preventing said device from holding the weft-thread and thereby causing the weft-fork to push the weft-thread through the weft-grid when the filling has been reduced on its carrier to a predetermined point.

3. In a loom, the lay, the shuttle-box, the shuttle, the filling carrier, a weft-thread holding device, the weft-grid, and a weft-fork, and means operated by a predetermined amount of filling on a filling carrier in the shuttle for preventing the weft-fork from tilting by the action of the weft-thread across the grid and preventing the weft-thread holding device from holding the weft-thread, to permit the weft-fork to push the weft-thread through the grid for the purpose stated.

4. In a loom, the lay, the shuttle-box, the shuttle, the filling carrier, a weft-grid and a weft-fork, a weft thread holding device determined amount of filling on a filling carrier for holding the weft-fork from tilting for the purpose stated.

5. In a loom, the lay, the shuttle-box, the shuttle, the filling carrier, a weft-grid and a weft-fork, a weft thread holding device and means operated by a predetermined amount of filling on the filling carrier, for preventing the weft-thread holding device from holding the weft-thread for the purpose stated.

6. In a loom, the lay, the shuttle-box, the shuttle, the filling carrier, a weft-grid and a weft-fork, and means operated by a predetermined amount of weft or filling located between the filling on the filling carrier and the weft-fork for holding the weft-fork from tilting for the purpose specified.

7. In a loom, the lay, the shuttle-box, the shuttle, the filling carrier, a weft-grid and a weft-fork, and yieldingly mounted means located between the filling on said carrier and the weft-fork for holding the weft-fork from tilting to cause said fork to force the weft-thread through the weft grid for causing the operation specified.

8. In a loom, the lay, the shuttle-box, the shuttle, the filling carrier, a weft-grid and a weft-fork, and a weft-fork hammer and means mounted on the lay and operated by a predetermined amount of filling and the breast-beam for holding and preventing the weft-fork from tilting to cause it to engage the weft-fork hammer to cause the operation specified.

9. In a loom, the lay, the shuttle-box, the shuttle, the filling carrier, the weft-grid and the weft-fork, and a filling feeler device, and means carried by the lay and controlled by said filling-feeler device for preventing the weft-work from tilting for causing the ejection of the filling carrier when the filling has been reduced to a predetermined point.

10. In a loom, the lay, the shuttle-box, the shuttle, a filling-carrier, a weft-grid, a weft-fork, and means operated by a predetermined amount of filling for holding the weft-fork from being tilted by the weft-thread.

11. In a loom, the lay, the shuttle-box, the shuttle, a filling carrier, a weft-grid, a weft-fork, and means for holding the weft-fork from being tilted when in operative position by the weft-thread which crosses the weft-grid.

12. In a loom, the lay, the shuttle-box, the shuttle, a filling carrier, a weft-grid, a weft-fork having a stop-pin, a feeler-device comprising a feeler-finger, a vertical supporting-arm therefor, a horizontal rock-shaft connected to said arm, an arm having a knife-edge on said rock-shaft, a vertical-arm pivotally mounted, a trip-pawl carried on the lower end of said arm, a spring pressed pin carried on the upper end of said arm and adapted to engage said stop pin of the weft-fork, a cam-arm on said rock-shaft, and means on the breast-beam adapted to engage said cam-arm, whereby the operation of the weft-fork is prevented for the purpose stated.

13. In a loom, the lay, the shuttle-box, the shuttle, a filling carrier, a weft-grid, a weft-fork having a stop-pin, a feeler-device for engaging the filling, means mounted on the lay adapted to automatically engage said stop-pin of the weft-fork, and means connecting the means for engaging the stop-pin, with the feeler-device, whereby the operation of the weft-fork is prevented.

14. In a loom, the lay, the shuttle-box, the shuttle, a filling carrier, a weft-grid, a weft-fork having a stop-pin, a feeler-device for engaging the filling, means mounted on the lay adapted automatically to engage said stop-pin comprising an arm pivotally mounted on the lay, a trip-pawl pivoted on the lower end of said arm, a spring pressed pin in the upper end of said arm co-acting with said stop-pin, means adapted to engage said trip-pawl whereby to hold said arm from movement, a shaft connecting said knife edged arm and the feeler-device, and means mounted on the breast-beam for rocking said shaft, for the purpose stated.

15. In a loom, the lay, the shuttle-box, the shuttle, a weft-grid, a weft-fork having a stop-pin, a feeler-device for engaging the filling, means mounted on the lay for automatically engaging said stop-pin comprising a pivotally mounted arm, a trip-pawl having a knife-edge pivoted on the lower end of said arm, a spring pressed pin in the upper end of said arm co-acting with said fork stop-pin, a horizontal arm having a knife-edge adapted to engage the knife-edge of the pawl, a shaft connecting said knife-edged arm and feeler-device, a torsion spring on said shaft causing the feeler-device to follow the reduction of the filling, means for rocking said shaft on the forward beat of the lay, a torsion spring on said shaft for retracting said shaft, means for maintaining the engagement of the trip-pawl with said knife-edged arm, and means for adjusting said pawl, the parts having such relation that the engagement of the trip-pawl with said knife-edged arm will be controlled by the action of the feeler device on the filling for preventing the weft-fork from tilting for the purpose stated.

16. In a loom, the lay, the shuttle-box, the shuttle, a filling carrier, a weft-grid and a weft-fork, a vertical arm pivoted on the lay, means whereby the upper end of said arm is caused to engage and prevent the weft-fork from tilting, a trip-pawl pivoted on the lower end of said arm, a horizontal rock-shaft, a feeler-device on one end of said shaft for engaging the filling, an arm on the other end of said shaft adapted for automatically engaging said trip-pawl, a torsion spring on said shaft causing the feeler-device to follow the reduction of the filling, means for adjusting the trip-pawl in relation to its co-acting arm, and means for rocking said shaft, for the purpose stated.

17. In a loom, the lay, the shuttle-box, the shuttle, a filling carrier, a weft-grid, and a weft-fork, an arm pivoted on the lay, means whereby the upper end of said arm is automatically caused to engage and prevent the weft-fork from tilting, a trip-pawl on the lower end of said arm, a horizontal shaft, a filling feeler device on one end of said shaft engaging the filling, an arm on the other end of said shaft adapted to automatically engage said pawl, a spring pressed cam-arm on said shaft, and an arm on the breast-beam adapted to engage said cam-arm on the forward beat of the lay, means for adjusting said cam-arm, and a torsion spring on said shaft causing the feeler device to follow the reduction of the filling and thereby the lowering of the knife-edged arm for the purpose stated.

18. In a loom, the lay, the shuttle-box, the shuttle, a filling carrier, a weft-grid, a weft-fork, a weft-thread holding device, a buffer comprising a core having a vertical face groove, a thin wall stretched over and covering said groove thereby forming a yielding buffer to impact upon the weft-thread on the forward beat of the lay.

19. In a loom, the lay, the shuttle-box, the shuttle, a filling carrier, a weft-grid, a weft-fork, a weft-thread holding device, a buffer comprising an unyielding core having a vertical face groove and a thin rubber tube stretched over the grooved core making thereby a yielding buffer to impact upon the weft-thread and hold it from being forced between the grid-bars on the forward beat of the lay.

20. In a loom, the lay, the shuttle-box, the shuttle, a filling carrier, a weft-grid, a weft-fork, a vertical arm pivoted on the lay, means whereby the upper end of said arm is caused to engage and prevent the weft-fork from tilting, a trip-pawl on the lower end of said arm, a horizontal rock-shaft, a feeler-device on one end of said shaft adapted to engage with said pawl, a cam-arm loosely mounted on said shaft, a spring connected to constantly depress said arm, a feeler-spring on said shaft connected to constantly maintain the engagement of the feeler-device with the filling independent of the rocking-movement of said shaft whereby the movement of the weft-fork is stopped by the conjoint action of the feeler device and the said engagement and tripping device.

21. In a loom, the lay, the shuttle-box, the shuttle, a weft-grid, a weft-fork, a vertical arm pivoted on the lay, means whereby the upper end of said arm is caused to engage and prevent the weft-fork from tilting, a trip-pawl on the lower end of said arm, a horizontal rock-shaft, a feeler device on one end of said shaft for engaging the filling an arm on the other end of said shaft adapted for engagement with said pawl, the feeler device and the said arm being arranged at right angles on said shaft to cause the said arm to have a downward movement simultaneous with and to the same extent as the contact movement of the feeler-device with the filling, a downwardly spring pressed cam-arm loosely mounted on said shaft, and a feeler-spring on said shaft connected to constantly press the feeler-device toward the filling, for the purpose stated.

22. In a loom, the lay, the shuttle-box, the shuttle, a weft-grid, a weft-fork, a weft-thread holding device including a buffer a spring pressed filling feeler device, a horizontal rock-shaft connected therewith, and mechanism controlled by said feeler-device and its connected shaft for preventing the tilting of said weft-fork, comprising a knife-edged arm, a trip-pawl for engagement therewith, a vertical shaft carrying said trip-pawl, a spring-pressed pin on the upper end of said arm adapted to engage and hold the weft-fork, a push-pin arranged to receive the impact of the upper end of said arm and the impact of the weft-thread holding-device, the said pins arranged to operate simultaneously with their respective members on the forward beat of the lay, and means for rocking said shaft independent of the function of the feeler device.

23. In a loom, the lay, the shuttle-box, the shuttle, a weft-grid, a weft-fork, a weft-thread holding device including a buffer, a filling feeler device, mechanism carried by the lay, controlled by said filling feeler device for preventing the weft-fork from tilting, and means carried by the breast-beam for positively actuating the said mechanism independent of the feeler device.

24. In a loom, a filling feeler mounted upon the lay and adapted to be actuated upon substantial exhaustion of the filling in the running shuttle, a weft replenishing mechanism, a weft fork, operative connections between the weft fork and the replenishing mechanism and an operative connection between the filling feeler and the weft fork, substantially as described.

25. In a loom, the lay, the shuttle box, the shuttle, the filling carrier, a weft grid, and a weft fork, and means operated by a predetermined amount of filling on the filling carrier for holding the weft fork from being tilted when in operative position by the weft thread crossing the grid during the forward movement of the lay.

26. In a loom having a weft fork and a weft replenishing mechanism, a filling feeler, mounted upon the lay and adapted to be actuated by substantial exhaustion of filling in a shuttle and operative connections between the filling feeler and the weft fork to cause the operation of the weft replenishing mechanism.

In testimony whereof I have signed my name to this specification in the presence of two subscribing witnesses.

FRANCIS ARTHUR MILLS.

Witnesses:
A. E. H. JOHNSON,
ANNE B. JOHNSON.